United States Patent

[11] 3,602,642

[72] Inventors Pieter Marinus Van Den Avoort; Lieuwe Terpstra, both of Emmasingel, Eindhoven, Netherlands

[21] Appl. No. 14,382
[22] Filed Feb. 26, 1970
[45] Patented Aug. 31, 1971
[73] Assignee U.S. Philips Corporation New York, N.Y.
[32] Priority Mar. 5, 1969
[33] Netherlands
[31] 6903362

[54] BEAM CURRENT STABILIZATION DEVICE FOR A TELEVISION PICTURE DISPLAY DEVICE
19 Claims, 4 Drawing Figs.

[52] U.S. Cl. .......... 178/7.5 R, 178/DIG. 29
[51] Int. Cl. .......... H04n 5/58
[50] Field of Search .......... 178/7.5 R, 7.5 DC, DIG. 29

[56] References Cited
UNITED STATES PATENTS
3,558,817 1/1971 Avoort et al. .......... 178/7.5

*Primary Examiner*—Robert L. Griffin
*Assistant Examiner*—George G. Stellar
*Attorney*—Frank R. Trifari

ABSTRACT: A television picture display device including a cathode current stabilization circuit of the picture display tube wherein the difference between the cathode current corresponding to a given reference signal and the cathode current corresponding to a blacker-than-black signal in the video signal to be displayed by the picture display tube is stabilized to obtain a perturbation current compensation.

Figure 1:
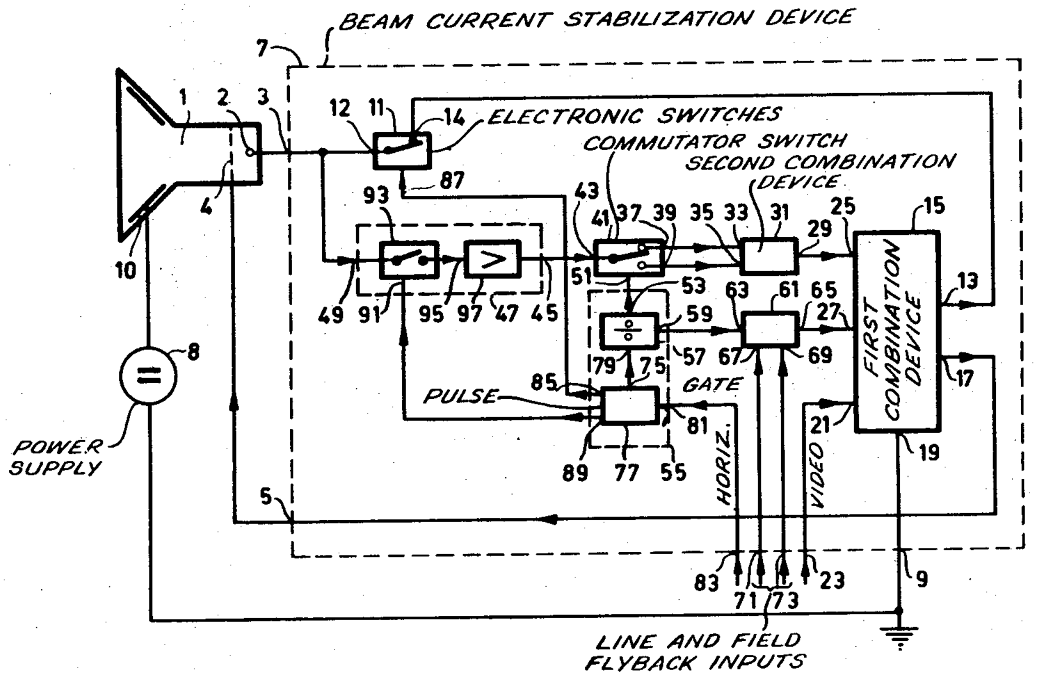

INVENTORS
PIETER M. VAN DEN AVOORT
LIEUWE TERPSTRA
BY
Frank R. Trifari
AGENT

INVENTORS
PIETER M. VAN DEN AVOORT
LIEUWE TERPSTRA
BY
[signature]
AGENT

INVENTORS
PIETER M. VAN DEN AVOORT
LIEUWE TERPSTRA
BY
Frank R. Trifari
AGENT

BEAM CURRENT STABILIZATION DEVICE FOR A TELEVISION PICTURE DISPLAY DEVICE

The invention relates to a television picture display device including a picture display tube having a cathode and a control electrode between which a beam current stabilization device is connected which beam current stabilization device includes an electronic switch connected to the cathode of the picture display tube, an operation signal input of the electronic switch being connected to an output of an operation signal generator, and a first combination device likewise connected to the cathode of the picture display tube which first combination device furthermore includes a video signal input, a connection to which the side of the electronic switch remote from the cathode is connected, and an output which is connected to the control electrode of the picture display tube. A television picture display device of the kind described above is known from U.S. Pat. No. 3,558,817. The cathode current of the picture display tube is measured during the occurrence of a reference signal in the video signal. For the rest of the time the cathode is directly connected to the first combination device. A control magnitude derived from the cathode current is added to the video signal in the first combination device. This combination of video signal and control magnitude is applied between the cathode and the control electrode of the picture display tube. As a result the cathode current is stabilized at a given value which is desired for the reference level.

The cathode current of the picture display tube can be stabilized at very low values with the aid of the known picture display device as described in the preamble. If this cathode current is stabilized on the black level of the signal to be displayed, a very low luminance in the picture black is obtained so that the contrast in the picture displayed may be large. It has, however, been found that the very low black luminance which can be obtained in this known picture display device is not completely constant.

It is an object of the present invention to correct this imperfection.

To this end a picture display device of the kind described in the preamble according to the invention is characterized in that the beam current stabilization device includes an electronic commutator-switch incorporated in the connection between the cathode and the first combination device which switch has at least an input connected to the cathode of the picture display tube and two outputs, and a second combination device likewise incorporated in the said connection and having at least two inputs which are each connected to a different output of the said outputs of the commutator-switch and an output which is connected to the corresponding input of the first combination device, while the operation signal generator includes a divider an output of which is connected to an operation signal input of the commutator-switch and an output of which is connected to an input of the first combination device for obtaining a periodically occurring reference level and a beam current suppression level likewise occurring periodically in the video signal to be displayed.

The Applicant has found that the incomplete constant black luminance was the result of perturbation signals which exert influence through the grid cathode circuit of the picture display tube on the cathode current of the picture display tube during the occurrence of the black level. This influence was found to be *inter alia* dependent upon the picture content. It was found that the cathode current was not a satisfactory measure of the beam current. An object of the step according to the invention is to measure the cathode perturbation currents separately and to subtract these from the overall cathode current so that only the actual beam current is stabilized.

A blacker-than-black level is periodically provided in the video signal to be displayed through the connection between the divider and the first combination device. During the occurrence of this level only perturbation currents flow in the cathode supply line because then the beam current is suppressed. During the other measuring periods the black level occurs in the video signal and the cathode current is composed of a beam current and an perturbation current. The measured cathode currents are each applied to a different input of two inputs of the second combination device through a commutator-switch operated by a divider output signal. The magnitudes caused by each of the two currents are subtracted from each other in this second combination device and a difference magnitude is obtained which is a measure of the actual beam current. This difference magnitude is then provided as a control signal together with the video signal in the first combination device between a cathode and a control electrode of the picture display tube. As a result the actual beam current is stabilized at a desired value associated with the reference level such as, for example, the black level in the video signal.

In order that the invention may be readily carried into effect, a few embodiments thereof will now be described in detail by way of example with reference to the accompanying diagrammatic drawings. For the sake of clarity the drawing only includes the details which are important for the understanding of the invention.

Figure 2:
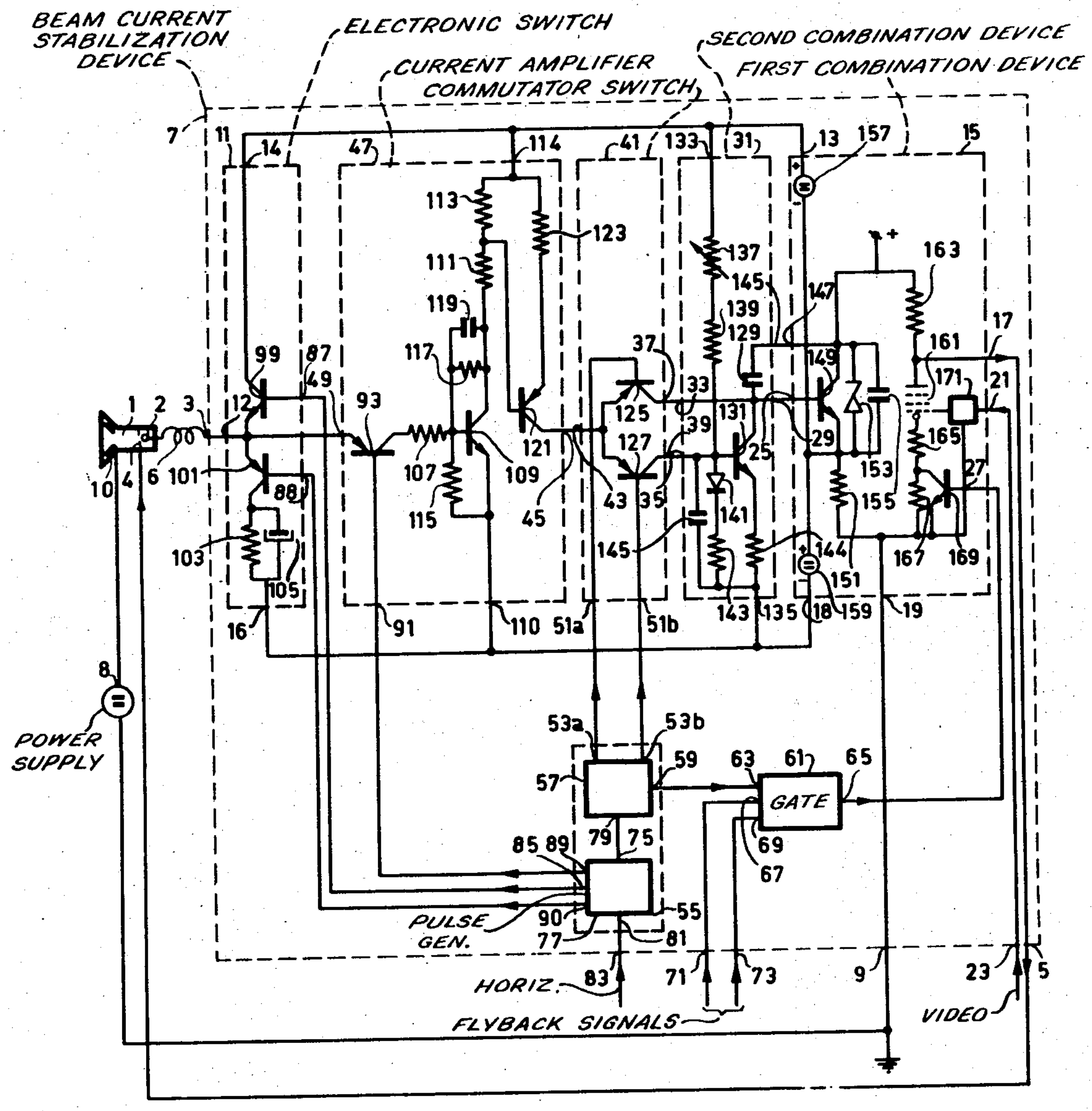
Figure 3:
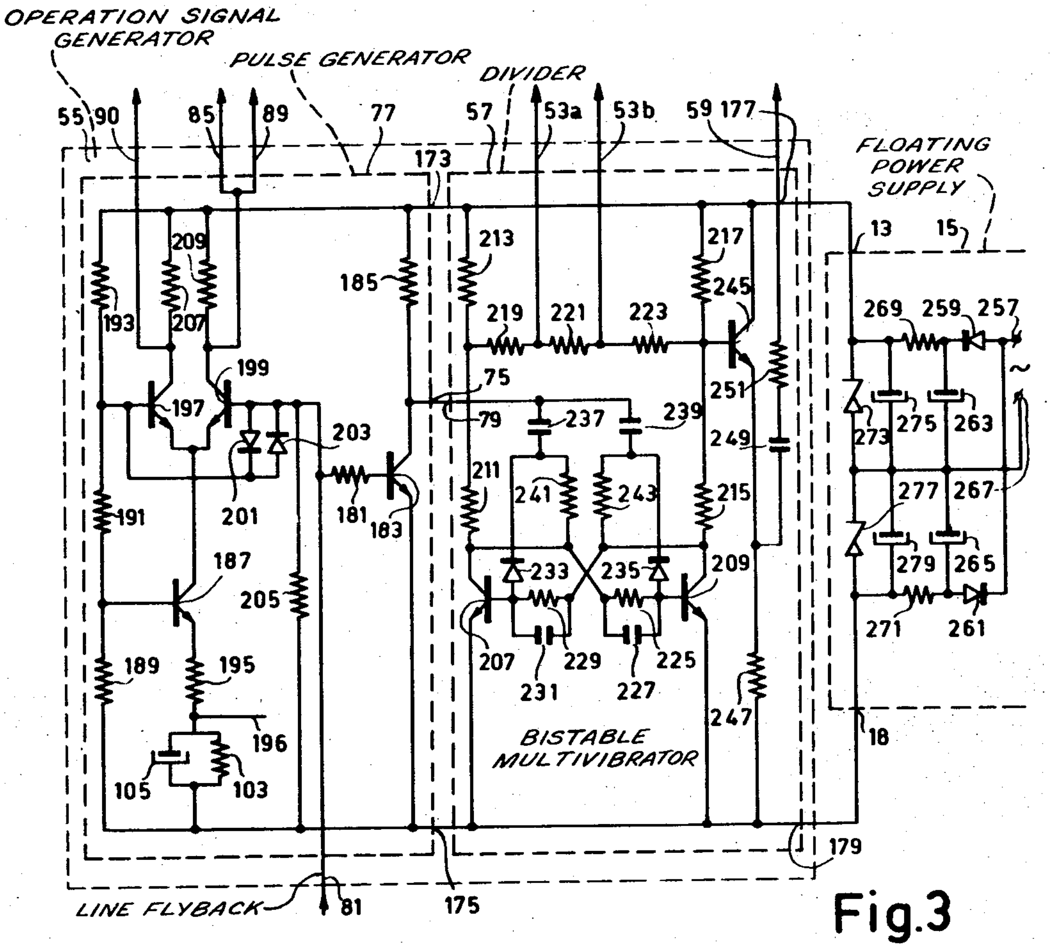
Figure 4:
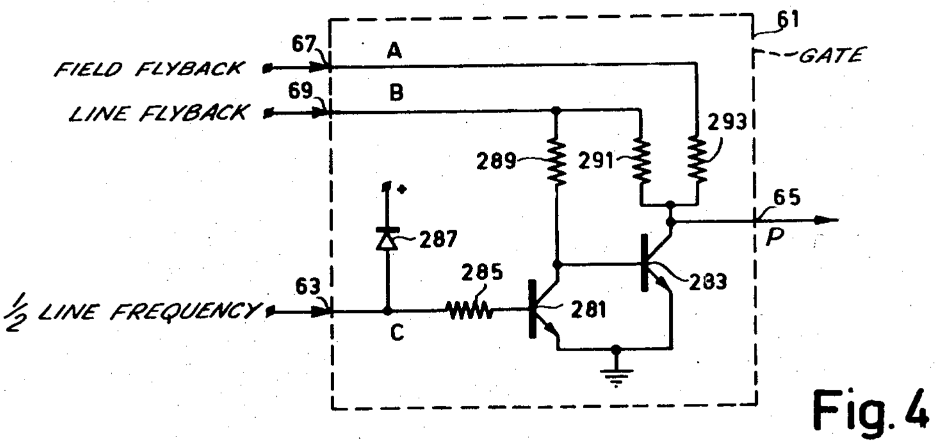

In the drawing:

FIG. 1 shows by way of a nondetailed block diagram a picture display device according to the invention, FIG. 2 shows by way of a nondetailed block diagram a possible embodiment of a picture display device according to the invention formed in accordance with the block diagram of FIG. 1, FIG. 3 shows by way of a nondetailed principle circuit diagram a possible operation signal generator and the connection thereof to two floating supply sources in the first combination device of a picture display device according to FIG. 2, FIG. 4 shows by way of a nondetailed principle circuit diagram a possible gating circuit for a picture display device according to FIG. 2 to obtain alternately a black level and a blacker-than-black level during the line blanking periods in the video signal.

In FIG. 1 a cathode 2 of a picture display tube 1 is connected to a connection 3 and a control electrode 4 is connected to a connection 5 of a beam current stabilization device 7. An EHT supply source 8 is connected between a connection 9 of the beam current stabilization device 7 and an EHT electrode 10 of the picture display tube 1. Furthermore the connection 9 is earthed.

The connection 3 of the beam current stabilization device 7 is connected through an output 12 of an electronic switch 11 and an input 14 thereof to a connection 13 of a first combination device 15. Connections 17 and 19 of the first combination device 15 are connected to the connections 5 and 9, respectively, of the beam current stabilization device 7.

A video signal input 21 of the first combination device 15 is connected to an input 23 of the beam current stabilization device 7.

The first combination device 15 furthermore includes a control signal input 25 and a gate input 27.

According to the invention the control signal input 25 of the first combination device 15 is connected to an output 29 of a second combination device 31 two inputs 33 and 35 of which are each again connected to a different output of two outputs 37 and 39 of a commutator switch 41. An input 43 of the commutator switch 41 is connected to an output 45 of a current amplifier circuit 47. An input 49 of the current amplifier circuit 47 is connected to the input 3 of the beam current stabilization device 7 connected to the cathode 2 of the picture display tube 1. According to the invention an operation signal input 51 of the commutator switch 41 is connected to an output 53 of a divider 57 included in an operation signal generator 55. A further output 59 of the divider 57 is connected to the input 27 of the first combination device 15. According to a further elaboration of the invention this connection includes a gating circuit 61. An input 63 of this gating circuit 61 is connected to the output 59 of the divider 57 and an output 65 is connected to the input 27 of the first combination device 15.

The gating circuit 61 furthermore includes a field flyback signal input 67 and a line flyback signal input 69 which are connected to inputs 71 and 73, respectively, of the beam current stabilization device 7.

An output 75 of a pulse generator 77 in the operation signal generator 55 is connected to an input 79 of the divider 57. An input 81 of the pulse generator is connected to a line flyback pulse input 83 of the beam current stabilization device 7.

Furthermore an output 85 of the pulse generator 77 is connected to an operation signal input 87 of the electronic switch 11 in the cathode circuit of the picture display tube 1 and an output 89 is connected to an operation signal input 91 of an electronic switch 93 incorporated in the current amplifier circuit 47.

An input of this electronic switch 93 is connected to the input 49 of the current amplifier circuit 47 and an output is connected to an input 95 of a current amplifier 97. An output of this current amplifier 97 is also the output 45 of the current amplifier circuit 47.

The operation of the circuit arrangement in so far as this is important for the understanding of the invention will now be described.

During the period of picture information to be displayed being present in the video signal at the input 21 of the first combination device 15 the electronic switches 11 and 93 are in the positions shown. The cathode 2 of the picture display tube 1 connected to the input 3 of the beam current stabilization device 7 is then interconnected to the connection 13 of the first combination device 15. A combination of the video signal applied to the input 21 and a control magnitude applied to the input 25 then appears between the connections 13 and 17 of this first combination device 15 and hence between the cathode 2 and the control electrode 4 of the picture display tube 1. The beam current of the picture display tube 1 thus has a value which is influenced by the control magnitude.

The switch 93 is open and there does not flow any cathode current from the picture display tube 1 to the current amplifier 97.

If a reference level occurs in the video signal which level must be coupled to a very small beam current, as, for example, the black level which generally occurs in the video signal during the entire line blanking period in picture display devices employing so-called index tubes, then the electronic switches 11 and 93 are brought to their other positions (not shown) by operation signals applied to the inputs 87 and 91 during a measuring period and during the occurrence of this black level in the line blanking period. The cathode current of the picture display tube 1 then flows through the input 3, the input 49, the then closed switch 93 to the input 95 of the current amplifier 97. The current amplifier 97 applies an amplified cathode current to its output 45 and hence to the input of the commutator switch 41.

The commutator switch 41 is alternately put into its position shown and its position not shown with the aid of an operation signal applied to its input 51 which signal originates from the output 53 of the divider 57. As a result the amplified cathode current applied to the input 43 appears alternately at the outputs 37 and 39 of the commutator-switch 41 and at the inputs 33 and 35 of the second combination device 31.

At the same time the black level in the line blanking period is lowered every other line to a so-called blacker-than-black level in the video signal which is applied to the control electrode 4 of the picture display tube 1 with the aid of an operation signal obtained from the output 59 of the divider 57 and applied through the gating circuit 61 to the input 27 of the first combination device 15. A video signal having alternately a black level and a blacker-than-black level during the line blanking period then appears at the output 17 of the first combination device so that during these periods the display tube conveys alternately a "black beam current" or no beam current.

Due to the adapted switching rhythm of the commutator switch 41 the amplified cathode currents are applied, for example, to the input 33 of the second combination device 31 which currents occur during the black signal, and the amplified cathode currents which occur during the occurrence of the blacker-than-black level in the video signal at the control electrode 4 of the picture display tube 1 are applied to the input 35.

The amplified cathode current pulses are converted in the second combination device 31 into control magnitudes and are subtracted from each other. One control magnitude derived from the amplified cathode current applied to the input 35 only contains information regarding the magnitude of the cathode current when the beam current in the picture display tube 1 is suppressed. This information originates from a perturbation current appearing at the cathode. The other control magnitude derived from the amplified cathode current applied to the input 33 contains information regarding the sum of the beam current and the perturbation current which flows in the picture display tube 1 during the occurrence of the black level.

The difference between the control magnitudes thus provides a control magnitude which substantially only contains information regarding the actual magnitude of the beam current during the occurrence of the black level in the video signal. This difference is applied through the output 29 of the second combination device 31 to the input 25 of the first combination device 15 and is combined in the first combination device 15 with the video signal and is again applied to the picture display tube 1. The magnitude of the beam current corresponding to the black level is maintained constant by the control loop described.

It is, of course, possible to use a different measuring rhythm and, for example, to carry out a measurement of the cathode current at the black level and at the blacker-than-black level in the video signal alternately during a first and a second part of the line blanking period or alternately during the field blanking period or alternately at the beginning of two sequential field scan periods.

However, as described above the most favorable manner of measuring is the measurement of the cathode current during alternately one line blanking period at a black level and the next line blanking period at a blacker-than-black level in the video signal. The perturbation current component in the cathode current during the line blanking period is in found to be dependent on the picture content, that is to say, on the video signal during the preceding line scan period. The picture content generally differs very little from line to line. The above-mentioned method therefore yields a very satisfactory result and also a very fast perturbation current compensation. The divider 57 may then be a frequency 2 to 1 divider which in most cases is already present in color television receivers of the PAL or SECAM types. This measuring method also gives a favorable ratio between the period of the cathode current being measured and the period of the cathode current being not measured.

A possible measurement alternately during a first and a second part of the line blanking period requires an accurate determination of the measuring periods so as to prevent grey bars from arising during the line flyback. In that case the divider 57 must be a time divider which divides the line blanking period into two suitable parts.

The use of a switched current amplifier circuit 47 prior to the commutator switch 41 is not absolutely necessary, but yields a better figure to noise-ratio in the signal to be measured. In fact, a signal only appears at the input 95 of the current amplifier 97 if measurement must actually take place, while furthermore the perturbation components possibly generated in the commutator switch 41 by the previous current amplification cannot exert substantially any influence.

It has been found to be advantageous to carry out the measurements during the measuring period which starts a little after the beginning of the corresponding reference signals in the video signal so as to avoid a too strong perturbation of the video signal from the previous line scan on the reference signal to be measured.

The picture display device according to the invention may in principle be used in any television picture display device, but it is especially important for devices employing an index tube. In picture display devices employing such a tube the beam current may not drop out during the occurrence of picture black in the video signal because then a correct color display does not occur any longer in many cases during the rest of the line. To obtain still enough contrast in the picture, the beam current must be as small as possible for black parts in the picture. A very small and constant beam current is obtained with the aid of the circuit arrangement according to the invention upon the occurrence of the black level in the video signal.

The gating circuit 61 which is incorporated between the output 59 of the divider 57 and the input 27 of the first combination device 15 has for its object to ensure that the measurement during the line blanking periods also continues during the field blanking periods. As a result a black current which is as correct as possible is obtained at the beginning of subsequent field scan periods while in addition a ripple of field frequency is prevented from occurring in the control signal. It will be evident that this gating circuit 61 is not strictly necessary for use of the invention.

In FIG. 2 corresponding components have as much as possible the same reference numerals as those in FIG. 1. Consequently, for the description thereof reference is made to the description of FIG. 1.

There are a few differences from FIG. 1. For example, the cathode 2 of the picture display tube 1 is connected through an inductor 6 to the input 3 of the beam current stabilization device 7. The inductor 6 serves for flashover safeguarding of the corresponding input of the beam current stabilization device.

The electronic switch 11 has a somewhat more complicated structure and has an additional input 88 connected to an additional output 90 of the pulse generator 77, and it has an additional connection 16 connected to an additional connection 18 of the first combination device 15.

Furthermore the commutator switch 41 is formed with two on-off switches each of which have different inputs 51*a* and 51*b* which are connected to outputs 53*a* and 53*b* respectively of the divider 57.

The structure and the operation of the electronic switch 11, the current amplifier circuit 47, the commutator switch 41, the second combination device 31 and the first combination device 15 will be described hereinafter.

The electronic switch 11 comprises a series arrangement of an NPN transistor 99 whose collector is connected to the connection 14, a PNP transistor 101 of which the emitter is connected to the emitter of the transistor 99 and a parallel arrangement of a resistor 103 and a capacitor 105 of which at one end is connected to the collector of the transistor 101 and at the other end to the connection 16 of the electronic switch 11. The connection between the emitters of the transistors 99 and 101 is connected to the connection 12 of the electronic switch 11 and to the input 49 of the current amplifier circuit 47. The bases of the transistors 99 and 101 are connected to the connections 87 and 88 of the electronic switch 11 and receive switching signals from the outputs 85 and 90 of the pulse generator 77. A supply voltage is present between the connections 14 and 16.

During the line scan period a voltage is applied from the pulse generator 77 to the inputs 87 and 88 such that the two transistors 99 and 101 are bottomed. The voltage across the resistor 103 and the capacitor 105 is applied in a manner not shown in this Figure to the pulse generator 77 so that the current flowing through the transistors 99 and 101 is stabilized. This subject will be reverted too in the description of FIG. 3.

The operation signal at the input 87 if thus rendered precisely so large that the transistor 99 substantially always draws the same current.

The operation signals at the inputs 87 and 88 furthermore have an amplitude such that the transistors 99 and 101 remain bottomed irrespective of the cathode currents which are caused by a video signal in the picture display tube 1. The transistors 99 and 101 are both connected as emitter followers for the operation signals applied to their bases and the voltage at the junction of their emitters continues to have a substantially constant difference relative to the voltage at the supply point 14. Possible voltage variations at the connection 14 are thus passed on unchanged to the cathode of the picture display tube 1.

During the measuring period in the line blanking period the operation signals at the inputs 87 and 88 and hence at the bases of the transistors 99 and 101 are such that the two transistors 99 and 101 do not convey current. The cathode current of the picture display tube 1 is then applied to the input 49 of the current amplifier circuit 47.

The input 49 in the current amplifier circuit 47 is connected to the emitter of a PNP transistor 93. The base of this transistor 93 is connected to the operation signal input 91 of the current amplifier circuit 47. The transistor 93 serves as an electronic switch; its collector is connected through a resistor 107 to the base of an NPN transistor 109. The emitter of transistor 109 is connected to a supply connection 110 connected to the connection 18 of the first combination device 15. The collector of the transistor 109 is connected through a series arrangement of resistors 111 and 113 to a supply connection 114 connected to the connection 13 of the first combination device 15. The base of the transistor 109 is furthermore connected through a resistor 115 to its emitter and through a parallel arrangement of a resistor 117 and a capacitor 119 to its collector. The connection between the resistors 111 and 113 is connected to the base of a PNP transistor 121. The emitter of this transistor 121 is connected through a resistor 123 to the supply connection 114. The collector of the transistor 121 is connected to the output 45 of the current amplifier circuit 47.

The operation of the current amplifier circuit 47 is as follows.

During the line scan period a voltage is applied to the operation signal input 91 such that the transistor 93 is cut off. During the measuring period in the line blanking period this voltage is such that the transistor 93 is bottomed and the cathode current coming from the cathode 2 of the picture display tube 1 is applied through the input 49, the transistor 93 and the resistor 107 to the base of the transistor 109. The base bias voltage for this transistor 109 and the collector bias voltage for the transistor 93 are provided for by the potential divider formed by the resistors 117 and 115 between the collector and the emitter of the transistor 109. The capacitor 119 has an integrating action so that the current pulses to be measured and which are amplified by the transistor 109 give the capacitor 119 in the measuring period during the line flyback period every time a charge which flows away again during the line scan period. Consequently, also during the line scan period when no current to be measured is applied to the transistor 109 the collector voltage of the transistor 109 still contains information regarding the magnitude of the cathode current in the previous line blanking period. This collector voltage is applied to the base of the transistor 121 through the potential divider formed by the resistors 111 and 113 which also provide for the base bias voltage of this transistor 121. The transistor 121 amplifies the signal applied to its base and applies a collector current to the output 45 which in turn passes on this current to the input 43 of the commutator switch 41. During the measuring period in the line blanking period and during the subsequent line scan period this current contains information regarding the magnitude of the cathode current during the corresponding line blanking period.

This information is alternately a measure of the cathode current which occurs when the video signal applied to the Wehnelt electrode 4 of the display tube 1 contains the black level and when the beam current of the display tube has a given value, and it is a measure of the cathode current which occurs when the video signal applied to the Wehnelt electrode 4 of the picture display tube 1 contains the blacker-than-black level and when the beam current is entirely suppressed.

The commutator switch 41 includes two PNP transistors 125 and 127 whose emitters are connected together and to the input 43. The base of the transistor 125 is connected to the input 51*a* and the base of the transistor 127 is connected to the input 51*b*. The inputs 51*a* and 51*b* receive operation signals in phase opposition from the outputs 53*a* and 53*b* of the operation signal generator 57.

During the time starting from one measuring period to the beginning of the next measuring period the transistor 125 is made conducting by the operation signals and the transistor 127 is cut off and during the time starting from the next measuring period to the beginning of the subsequent measuring period the transistor 127 is made conducting and the transistor 125 is cut off. The amplified cathode current applied to the input 43 is alternately passed on through the transistor 125 to the output 37 and hence to the input 33 of the second combination device 31 and then again through the transistor 127 to the output 39 and hence to the input 35 of the second combination device 31.

One end of a capacitor 129 is directly connected to the input 33 of the second combination device 31 and through a polarity inverter stage including an NPN transistor 131 to the input 35. The base of the transistor 131 is connected to the input 35 and its collector is connected to the connection of the capacitor 129 connected to the input 33. The base of the transistor 131 is furthermore connected to a tapping on a potential divider which is connected between a supply voltage connection 133 which is connected to the connection 13 and a supply voltage connection 135 which is connected to the connection 18 of the first combination device 15. This potential divider is a series arrangement of a variable resistor 137 connected to the connection 133, a resistor 139, a diode 141 connected in the pass direction, and a resistor 143. The emitter of the transistor 131 is connected to the supply connection 135 through a resistor 144, the value of which preferably is equal to that of the resistor 143. The connection between the resistor 139 and the diode 141 is connected to the base of the transistor 131 and furthermore through a capacitor 145 to the supply voltage connection 135. The capacitor 145 serves to render the symmetry of the signal paths from the input 43 of the commutator switch 41 to the capacitor 129 as satisfactory as possible. The end of the capacitor 129 remote from the collector of the transistor 131 is connected to a positive voltage source through a connection 145 of the second combination device 31 and a connection 147 of the first combination device 15.

A current is alternately applied to the connection of the capacitor 129 connected to the output 29 from the input 35 through the inverter transistor 131 or taken therefrom through the input 33. The current flowing through the input 33 occurs when the transistor 125 of the commutator switch 41 is conducting. This conducting takes place during the measuring period in those line flyback periods when a black level in the video signal is applied to the picture display tube 1 and during the subsequent line scan periods up to the beginning of the following measuring period. The current flowing through the input 35 occurs when the transistor 127 of the commutator switch 41 is conducting. This is the case during the measuring period in those line flyback periods when a blacker-than-black level is applied to the picture display tube 1 and during the subsequent line scan periods up to beginning of the following measuring period. This current is applied to the base of the transistor 131. Furthermore an additional current is applied through the variable potential divider 137, 139, 141, 143 to the base of the transistor 131 so that the luminance of the display of the black level on the picture display tube 1 is determined. The current applied to the base of the transistor 131 causes a current to flow in its collector which is directed towards this collector. If a current is applied to the input 33 of the second combination device 31 the voltage at the connection connected thereto of the capacitor 129 will increase and if a current is applied to the input 35 this voltage will decrease. The mean voltage across the capacitor 129 and hence at the output 29 is therefore dependent on the difference between the currents applied to the inputs 33 and 35 and the bias current from the base variable potential divider 137, 139, 141, 143 of the transistor 131 and is thus a measure of the actual beam current. This voltage across the capacitor 129 is passed on through the output 29 to the input 25 of the first combination device 15.

The input 25 of the first combination device 15 is connected to the base of an NPN transistor 149 connected as an emitter follower. The collector of the transistor 149 is connected to a positive supply voltage and the emitter is connected to earth through a resistor 151, the connection 19 of the first combination device 15 and the connection 9 of the beam current stabilization device 7. The emitter of the transistor 149 is furthermore connected through a parallel arrangement of a zener diode 153 and a capacitor 155 to the collector, through a first floating supply source 157 to the connection 13 and through a second floating supply source 159 to the connection 18 of the first combination device 15. The floating supply source 157 and 159 are arranged in series and apply a voltage to the connection 13 of the first combination device 15 which is positive relative to the voltage at the emitter of the transistor 149, and they apply a voltage to the connection 18 of the first combination device 15 which is negative relative thereto.

The voltage at the input 25 of the first combination device 15 appears at the base of the transistor 149 and is passed on to its emitter and, increased by the voltage of the floating supply source 157, is passed on to the connection 13 of the first combination device 15 and furthermore to the cathode of the picture display tube 1 through the connection 14 of the switch 11 and the transistor 99 during the line scan period if this transistor is bottomed. The voltage at the emitter of the transistor 149, decreased by the voltage of the floating supply source 159, appears at the connection 18 of the first combination device 15 and furthermore at the connection 110 of the current amplifier circuit 47 where this voltage is present as a reference value during the measuring period at the emitter of the excited transistor 109 towards which then flows the cathode current to be measured of the picture display tube 1.

Apart from a bias current the voltage at the input 25 of the first combination device 15 is only dependent on the actual beam current of the picture display tube during the occurrence of the black level. A possible undesired increase of the beam current causes the voltage at the input 25 to increase so that the voltage at the cathode 2 of the picture display tube 1 increases through the emitter of the transistor 149 and the beam current decreases again because the voltage at the Wehnelt electrode 4 of the display tube 1 does not show any increase. In this manner the actual beam current corresponding to the black level in the video signal is maintained very constant.

The object of the zener diode 153 is to limit the control range of the circuit arrangement and consequently to safeguard *inter alia* the picture display tube 1. In fact, a too low cathode voltage of the picture display tube is prevented by which the beam current might increase too much such as might be the case, for example, for a faulty transistor 149 or when switching on the receiver. The capacitor 155 serves to damp transient phenomena to safeguard the transistor 149.

The first combination device 15 furthermore includes a video output valve 161. The anode of this output valve 161 is connected through a resistor 163 to the positive supply voltage to which also the collector of the transistor 149 is connected. The anode is furthermore connected to the output 17 of the first combination device 15. The cathode of the valve 161 is connected to earth through a series arrangement of a resistor 165 and a resistor 167. An NPN transistor 169 is arranged in parallel with the resistor 167 the collector of which transistor is connected to the junction of the resistors 165 and 167 and the emitter is connected to earth. The base of the transistor 169 is connected to the input 27 of the first combination device 15. The control grid of the valve 161 is connected through a black level introducing device 171 to the video signal input 21 of the first combination device 15.

A video signal to be displayed is applied to the input 21. This video signal has a black level at the control grid of the video output valve during the line blanking period. This level may be introduced therein, for example, by the black level introducing device 171 or already at an earlier stage.

During the line scan periods when picture information must be displayed the transistor 169 is not conducting and the cathode voltage of the video output valve 161 is higher than during the periods when the transistor 169 is conducting. The transistor 169 is conducting every other line blanking period (also during the field blanking period) and furthermore also during the line scan periods of the field flyback period. The conducting condition during these periods and the nonconducting condition during the rest of the period is provided for by the operation signal applied through the input 27 to the base of the transistor 169 and originating from the gating circuit 61. When the transistor 169 is conducting the resistor 167 of the cathode resistor 167, 168 of the output valve 161 is substantially short circuited and the output valve 161 starts to draw more current so that its anode voltage decreases. As a result the voltage at the output 17 of the first combination device 15 and at the Wehnelt electrode 4 of the picture display tube 1 decreases. The voltage difference between the Wehnelt electrode 4 and the cathode 2 is always adjusted by the above-described control system in such a manner that the picture display tube 1 is just not cut off when a black level in the video signal is present at the Wehnelt electrode 4. This is the case during the line blanking periods when the transistor 169 is not conducting. During the line blanking periods when the transistor 169 is conducting the beam current in the picture display tube 1 will thus be cut off. The video signal at the anode of the valve 161 then has a blacker-than-black level as a result of the above-mentioned shunt of the resistor 167 by the transistor 169 in the cathode circuit of the output valve 161.

It will be evident that the above-described kinds of transistors and supply sources are not essential for the use of the steps according to the invention. If desired valves or other active elements instead of the said transistors and conversely may be used. This also applies to the other Figures.

A possible operation signal generator 55 and the series arrangement of floating supply sources in the first combination device 15 is shown in FIG. 3. The same reference numerals as those in FIGS. 1 and 2 have been used for corresponding components in this Figure so that for the description thereof reference is made to the relevant descriptions.

As already previously stated the operation signal generator 55 includes a pulse generator 77 and a divider 57. Both the pulse generator 77 and the divider 57 are fed by the floating supply source circuit of the first combination device 15. The pulse generator 77 has to this end two connections 173 and 175 and the divider 57 also has two supply connections 177 and 179. The connection 173 of the pulse generator 77 and the connection 177 of the divider 57 are connected to the connection 13 of the first combination device 15 and the connection 175 of the pulse generator 77 and the connection 179 of the divider 57 are connected to the connection 18 of the first combination device 15.

Positive going line flyback pulses are applied to the input 81 of the pulse generator 77. These pulses are on the one hand applied through an inverter stage to the output 75 of the pulse generator 77 and on the other hand to a so-called long-tailed pair circuit arrangement.

The inverter stage includes a resistor 181 which is connected to the input 81 of the pulse generator 77 the other end of which resistor is connected to the base of an NPN transistor 183. The emitter of the transistor 183 is connected to the supply connection 175 and the collector is connected to the output 75 of the pulse generator 77 and through a resistor 185 to the supply connection 173 of the pulse generator 77. The line flyback pulses become available in a negative going form at the output 75 of the pulse generator 77.

The long-tailed pair circuit arrangement includes an NPN DC current source transistor 187 whose base is connected to a tapping at the area of a connection between two resistors 189 and 191 of a potential divider. The other end of the resistor 189 is connected to the supply connection 175 of the pulse generator 77. The other end of the resistor 191 is connected through a resistor 193 to the other supply connection 173 of the pulse generator 77. The emitter of the transistor 187 is connected through a resistor 195 and the parallel arrangement of the resistors 103 and the capacitor 105 to the supply connection 175 of the pulse generator 77. The resistor 103 and the capacitor 105 are shown once for the sake of clarity. Actually these are the same elements as those in the switch 11 of FIG. 2. A connection symbolically indicated by the line 196 is present between the corresponding points so that the said elements only occur once. In addition to the current from the current source transistor 187 the resistor 103 also conveys the collector current of the transistor 101 of the switch 11. The rest of the long-tailed pair circuit arrangement is formed by two NPN transistors 197 and 199 whose emitters are connected to the collector of transistor 187 and in which the connection between the resistor 191 and 193 of the potential divider is connected directly to the base of the transistor 197 and through an antiparallel arrangement of diodes 201 and 203 to the base of the transistor 199. The base of the transistor 199 is furthermore connected to the input 81 and through a resistor 205 to the supply connection 175 of the divider 57. The collectors of the transistors 197 and 199 are connected through resistors 207 and 209 to the supply connection 173 of the pulse generator 77 and are furthermore connected to the outputs 90, 85 and 89, respectively, of the pulse generator 77.

The long-tailed pair circuit arrangement operates as follows. The current source transistor 187 provides a current which is determined by the voltage across its base and the voltage across the connection 196 which is also dependent on the current which flows through the series-arranged transistors 99 and 101 of the switch 11 of FIG. 2. The voltage difference between the bases of the transistors 197 and 199 determines the distribution of the current provided by the current source transistor 187 over the transistors 197 and 199. During the line scan the voltage across the base of the transistor 199 is lower than that across the base of the transistor 197 and the transistor 197 conveys substantially all current provided by the transistor 187. The voltage at the collector of the transistor 197 is then lower than the voltage at the collector of the transistor 199. The voltage at the output 90 is thus negative relative to that at the outputs 85 and 89 of the pulse generator 77. As a result the transistors 99 and 101 in the switch 11 of FIG. 2 are bottomed and produce a voltage on the line 196 across the resistor 103 and the capacitor 105 which voltage is a measure of the current flowing through the transistors 99 and 101. This current again determines the voltage difference between the outputs 90 and 85 of the pulse generator 77. Possible variations in the current flowing through the transistors 99 and 101 are therefore counteracted. The transistor 93 in the current amplifier circuit 47 of FIG. 2 is then simultaneously cut off.

During the measuring period a positive going pulse is present at the input 81 and the base of the transistor 199 becomes positive relative to that of the transistor 197. The collector of the transistor 199 then becomes negative relative to that of the transistor 197 and the output 90 of the pulse generator 77 thus becomes positive relative to the outputs 85 and 89 thereof. In the switch 11 of FIG. 2 the transistors 99 and 101 are then cut off and the transistor 93 of the current amplifier circuit 47 of FIG. 2 is conducting.

The divider 57 includes a bistable multivibrator having two NPN transistors 207 and 209. The emitters of these transistors 207 and 209 are connected to the supply connection 179 of the divider 57. The supply connection 177 of the divider 57 is connected to the collector of the transistor 207 through a series arrangement of two resistors 211 and 213 and to the collector of the transistor 209 through a series arrangement of two resistors 215 and 217. A series arrangement of three resistors 219, 221 and 223 is provided between the junction of the resistor 211 and the resistor 213 and the junction of the resistor 215 and the resistor 217. The junction of the resistors 219 and 221 is connected to the output 53*a* and the junction of the resistors 221 and 223 is connected to the output 53*b* of the divider 57. The collector of the transistor 207 is furthermore connected through a parallel arrangement of a resistor 225 and a capacitor 227 to the base of the transistor 209. The base of the transistor 207 is connected through a parallel arrangement of a resistor 229 and a capacitor 231 to the collector of the transistor 209. The bases of the transistors 207 and 209 are each connected through a series arrangement of diodes 233 and 235 and capacitors 237 and 239 to the input 79 of the divider 57. The junctions of the diodes 233 and 235 and the capacitors 237 and 239 are connected through resistors 241 and 243 to the collectors of the transistors 207 and 209, respectively. The junction of the resistors 215 and 217 is furthermore connected to the base of an NPN transistor 245. The collector of this transistor 245 is connected to the supply connection 177 and the emitter is connected through a resistor 247 to the supply connection 179 of the divider 57. The emitter is furthermore connected through a series arrangement of a capacitor 249 and a resistor 251 to the output 59 of the divider 57.

The bistable multivibrator including the transistors 207 and 209 every time changes its condition at the beginning of the pulse applied to the input 81 of the pulse generator 77 and hence on the negative going edge of the pulse applied through the input 79 of the divider 57. The positive going edges are cut off by the diodes 233 and 235. The negative going edges are only passed on by either diode 233 or 235 the corresponding resistor 241 or 243 of which is connected to a collector of one of the transistors 207 or 209 which exactly shows a small voltage difference between the base of the same transistor when the said negative going edge occurs. The circuit arrangement thus operates at a 2 to 1 divider.

The transistor 245 series as an emitter follower to provide a load at the output 59 which does not influence the bistable multivibrator.

The floating supply source in the first combination device 15 are formed by two diodes 259 and 261 connected in opposite directions to a connection 257 of a floating alternating voltage source not shown. The other ends of these diodes 259 and 261 are connected through smoothing capacitors 263 and 265 to the other connection 267 of the floating alternating voltage source. The connection between the cathode of the diode 259 and the capacitor 263 is connected through a resistor 269 to the connection 13 and the connection between the anode of the diode 261 and the capacitor 265 is connected through a resistor 271 to the connection 18 of the first combination device 15. Furthermore the connection 267 of the alternating voltage source is connected to the connection 13 of the first combination device 15 through the parallel arrangement of a Zener diode 273 and a capacitor 275 and is connected to the connection 18 through a parallel arrangement of a zener diode 277 and a capacitor 279.

The gating circuit 61 of FIG. 4 includes two NPN transistors 281 and 283. The emitters of these transistors are connected to earth. The base of the transistor 281 is connected through a resistor to the input 63 of the gating circuit 61. This input 63 is furthermore connected to a positive voltage through a limiter diode 287. The collectors of the transistors 281 and 283 are each connected through resistors 289 and 291 to the input 69 of the gating circuit 61. The collector of the transistor 283 is furthermore connected to the output 65 and through a resistor 293 to the input 67 of the gating circuit 61.

A square wave originating from the output 59 of the divider 57 is applied to the input 63, a positive going field flyback pulse is applied to the input 67 and a positive going line flyback pulse is applied to the input 69.

The operation of the gating circuit 61 is as follows. Positive line flyback pulses are applied to the base and the collector of the transistor 283 through the resistor 289 and 291, respectively. Every other line flyback pulse at the base of the transistor 283 is suppressed as a result of the square wave of half the line frequency which occurs at the base of the transistor 281 and which causes this transistor to be conducting during the occurrence of the positive portions of this square wave. The transistor 283 is therefor cut off during every other line flyback period. Since both the positive going line and filed flyback pulses are applied to the collector of the transistor 283 these pulses will only become available at the output 65 when the transistor 283 is not conducting. As a result it is achieved that both during the field flyback period and beyond this period an output voltage occurs at the output 65 every time during one line flyback period and does not occur at the output 65 during the next line flyback period and in addition an output voltage occurs during the field flyback period outside the line flyback periods. Boolean algebraically, the output voltage P at the output 65 can be written as: $P=(A+B)(BC')'=(A+B)(B'+C)=CA+AB'+BC$ wherein $A$ is the voltage at the input 67, $B$ is the voltage at the input 69, $C$ is the voltage at the input 63 and $B'$ is the inverse voltage $B$.

It will be evident to those in the art that there are many embodiments of gating circuits which can provide this switching function.

In the above mentioned embodiment the delay of the beginning of the measuring period of the cathode current relative to the beginning of the black level in the video signal at the Wehnelt electrode of the display tube is obtained because all signals which are applied to the operation signal generator 55 and the gating circuit 61 have a possible changeover instant some time, preferably from half a microsecond to 1 microsecond, after the beginning of the line flyback while the black level which is introduced into the video signal by the black level introducing device 171 or prior thereto already starts at the beginning of the line flyback. It will be evident that such a delay can be obtained in many manners, for example, by causing the line flyback pulse to excite a corresponding pulse generator at two different levels.

In the foregoing an embodiment was described of a display device including a display tube having a single electron gun such as, for example, a monochrome display device or a color television display device employing an index tube. It is, of course, alternatively possible to use the circuit arrangement according to the invention in a picture display device including, for example, a display tube having a threefold electron gun system in which then the beam current measuring and stabilization device will generally at least partly be formed in triplicate. Furthermore it is possible to apply the control voltage which brings about the stabilization and/or the blacker-than-black signal which suppresses the beam current to a suitable control electrode of the picture display tube other than the electrode shown in the embodiment. Thus the control voltage may, for example, be applied to the Wehnelt electrode or even to a subsequent electrode. Also the blacker-than-black signal may be applied to a subsequent electrode.

What I claim is:

1. A television picture display device including a picture display tube having a cathode and a control electrode between which a beam current stabilization device is connected which beam current stabilization device comprises: a first combination device including a video signal input, a cathode output, an output coupled to said control electrode, a control signal input and a gate input; an operation signal generator providing control signals at both a scanning frequency and at one-half that scanning frequency by way of a divider; a first electronic switch coupled intermediate said cathode and said cathode output and controlled by the scanning frequency control signal applied thereto; an electronic commutator switch having an input and two outputs, the commutator switch input being coupled to one of said two outputs under the control of the one-half scanning frequency control signal applied thereto; means for coupling said cathode to the input of said commutator switch input; a second combination circuit having two inputs connected to the respective outputs of said commutator switch, and an output coupled to said control signal input of said first combination device; and means coupled intermediate a one-half scanning frequency control signal output of said operation signal generator and said gate input of said first combination device for obtaining a periodically occurring reference level and a beam current suppression level in the video signal to be displayed.

2. A television picture display device as claimed in claim 1, characterized in that a current amplifier circuit is included in said means for coupling said cathode to the input of said commutator switch.

3. A television picture display device as claimed in claim 2, characterized in that the current amplifier circuit includes a second electronic switch being controlled by a scanning frequency control signal applied thereto.

4. A television picture display device as claimed in claim 1, wherein the first combination device includes an active element an output electrode of which is connected to the control electrode of the picture display tube, a control electrode of said active element being connected to the video signal input of the first combination device, characterized in that an impedance is incorporated in a supply of a further control electrode which supply conveys at least part of the output current of the active element, a further electronic switch incorporated in the first combination device connected in parallel with at least part of said further impedance, said electronic switch being coupled to said gate input.

5. A television picture display device as claimed in claim 4, characterized in that the first combination device includes a transistor arranged as an emitter follower the base of which is connected to the output of the second combination device and the emitter of which is connected to a connection of the said further electronic switch.

6. A television picture display device as claimed in claim 5, characterized in that the first combination device includes a series arrangement of two floating supply sources to the junction of which an input of the first combination device is connected, and wherein said first electronic switch comprises two electronic switches connected to said cathode, and connected in series across the series arranged floating supply sources.

7. A television picture display device as claimed in claim 6 wherein said means for coupling said cathode to the input of said commutator switch comprises a current amplifier with a supply voltage input which is connected between the ends of the series arrangement of floating supply source.

8. A television picture display device as claimed in claim 6 wherein the first combination device includes a transistor connected as an emitter follower whose base is connected to the output of the second combination device, characterized in that the emitter is connected to the junction of the two series-arranged floating supply sources.

9. A television picture display device as claimed in claim 5, characterized in that a capacitor is connected between the base and the collector of the said transistor arranged as an emitter follower.

10. A television picture display device as claimed in claim 1, characterized in that the second combination device includes a phase inverter stage having two inputs which are each connected to a different output of the commutator switch, and an output connected to the output of the second combination device, a phase inversion of a signal applied to one of the inputs of the phaseinverter stage taking place from this input to the output, the signal being passed on in the same phase from the other input of the phase inverter stage to the output.

11. A television picture display device as claimed in claim 10, characterized in that the commutator switch includes a circuit having two emitter-coupled transistors to the common emitters of which a current source circuit is connected, the cathode of the picture display tube being connected to an input of said current source circuit, while the collectors of the emitter-coupled transistors are each connected to a different input of the said phase inverter stage and the bases of the emitter-coupled transistors are each connected to a different output of the divider, the latter outputs supplying switching voltages in phase opposition.

12. A television picture display device as claimed in claim 10, wherein the first combination device includes a series arrangement of two floating supply sources, characterized in that the commutator switch and the phase inverter stage are connected to the ends of the series arrangement of floating supply sources.

13. A television picture display device as claimed in claim 1, wherein the first combination device includes a series arrangement of two floating supply sources, characterized in that the divider is connected to the ends of the series arrangement of floating supply sources.

14. A television picture display device as claimed in claim 1, characterized in that the cathode of the picture tube is connected through an inductor to the rest of the circuit arrangement.

15. A television picture display device as claimed in claim 1, characterized in that the television picture display device includes a delay circuit for delaying the beginning of the control signals relative to the end of one writing period of the time base.

16. A television picture display device as claimed in claim 15 wherein the operation signal generator provides signals of the line frequency and the divider provides signals of half the line frequency, characterized in that the delay period of the delay circuit is longer than half a microsecond and shorter than one microsecond.

17. A television picture display device as claimed in claim 1, characterized in that said means coupled intermediate a one-half scanning frequency control signal output of said operation signal generator and said gate input of said first combination device comprises a gating circuit including a field flyback signal input and a line flyback signal input.

18. A television picture display device as claimed in claim 6, characterized in that the electronic switches connected to the cathode of the picture display tube are formed by a series arrangement of two complimentary transistors whose emitters are connected to the cathode of the picture display tube, the collector of one transistor being connected to one end of one of the floating supply sources and the collector of the other transistor being connected through a resistor to one end of the other floating supply source, while the bases of the complementary transistors are connected to balanced outputs of the divider.

19. A television picture display device as claimed in claim 18, characterized in that the divider consists of a bistable multivibrator connected in parallel with the series arranged floating supply sources.